United States Patent [19]

Ellis

[11] Patent Number: 5,582,085
[45] Date of Patent: Dec. 10, 1996

[54] DYNAMIC INFEED CONTROL WITH WORKPIECE OSCILLATION FOR SEGMENTING SWARF IN A LATHE APPLICATION

[75] Inventor: Johnny P. Ellis, Broken Arrow, Okla.

[73] Assignee: Coburn Optical Industries, Inc., Tulsa, Okla.

[21] Appl. No.: 336,335

[22] Filed: Nov. 9, 1994

[51] Int. Cl.⁶ .................................................. B23B 25/02
[52] U.S. Cl. .............................. 82/118; 82/134; 82/904
[58] Field of Search ......................... 82/1.11, 134, 904, 82/118

[56] References Cited

U.S. PATENT DOCUMENTS

| | | | |
|---|---|---|---|
| 4,693,146 | 9/1987 | Dombrowski et al. | 82/904 |
| 5,113,728 | 5/1992 | Medeksza | 82/904 |
| 5,291,812 | 5/1994 | Yen et al. | 82/904 |

FOREIGN PATENT DOCUMENTS

| | | | |
|---|---|---|---|
| 140701 | 6/1987 | Japan | 82/904 |

*Primary Examiner*—M. Rachuba
*Assistant Examiner*—Kenneth J. Hansen
*Attorney, Agent, or Firm*—Frank J. Catalano; Scott R. Zingerman

[57] ABSTRACT

A dynamic infeed control is used to segment swarf produced in a lathing operation into short manageable segments. The preferred dynamic method for segmenting the swarf is to add a sine wave motion to the nominal infeed motion. The amplitude of the sine wave is 0.5 times the nominal infeed, although this may vary somewhat due to the properties of the specific material being machined. The frequency of the sine wave is a non-zero integral multiple of the rotational frequency of the lens plus 0.5. Thus the minimum sine wave frequency will be 1.5 times the rotational frequency of the lens and this factor may increase by increments of 1. In equation form, $W_{SW}=(n+0.5)\times W_{RL}$ where $W_{SW}$ is the frequency of the sine wave, $W_{RL}$ is the rotational frequency of the lens and n is an integer equal to or greater than 1. Thus relative minima and maxima are created during one lens rotation that correspond to the relative maxima and minima on the next lens rotation, respectively. This causes the width of the strand of swarf to cycle in a range between approximately twice the nominal infeed and zero. Reducing the width of the strand to zero results in segmenting or breaking the strand of swarf. Because it may not be necessary to fully reduce the width of the strand to zero to break it, the amplitude of the sine wave may be relaxed somewhat depending on the material in question.

7 Claims, 4 Drawing Sheets

DYNAMIC INFEED CONTROL WITH WORKPIECE OSCILLATION FOR SEGMENTING SWARF IN A LATHE APPLICATION

BACKGROUND OF THE INVENTION

This invention relates generally to lathe machines and more particularly concerns the swarf accumulated during the lathe shaping of certain metals and plastics.

In the lathe shaping of wood and also of plastics based in thermoset resins, the resulting swarf generally consists of fine particles or powder. Swarf in this form is readily collected by vacuum into a relatively high density mass suitable for storage and transport. However, in the lathe shaping of metals and of plastics based in thermoplastic resins, the swarf is accumulated in long, continuous, curled or spiraled strands.

For example, one such plastic is the shock resistant, virtually indestructible polycarbonate used in safety lenses, children's spectacle lenses and the like. In the lathe shaping of such lenses, the resulting polycarbonate strand makes swarf removal difficult because it easily tangles and snags, interrupting flow of the swarf along the vacuum path and backing the swarf up into the lens generating equipment. It also adversely affects the surface finish of the lens as the swarf collects around the cutting tool. Similar problems are experienced in other lathe applications.

In the spectacle lens industry, present solutions to the swarf strand problem include chipping, melting and constant vigilance approaches. In the chipping approach auxiliary equipment in the vacuum path breaks or mulches the swarf strand into small segments that are more easily manageable. Such equipment is costly, extremely noisy and readily subject to failure as broken swarf frequently finds its way into the equipment's bearings. The melting approach, while technically feasible, is unfortunately impractical as further auxiliary equipment is required to collect the swarf and bring the swarf to melting temperatures. The resulting solidified mass presents a new set of management problems all its own. The constant vigilance approach requires the continuing presence of supervisory personnel to interrupt operation of the lathe, remove the swarf and restart the lathing process every time tangling, snagging or undesirable collection of swarf occurs. The result is frequent and lengthy down time. Even after the lathe is cleared of this swarf, the swarf still remains in its unmanageable long strand condition.

It is, therefore, an object of this invention to provide a swarf control which causes swarf produced by a lathe to be segregated into manageable lengths. A further object of this invention is to provide a swarf control which causes swarf to be segmented by the lathe itself rather than by auxiliary equipment not otherwise needed in the lathing process.

SUMMARY OF THE INVENTION

In accordance with the invention, a dynamic infeed control is used to segment swarf produced in a lathing operation into short manageable segments.

The preferred dynamic method for segmenting the swarf is to add a sine wave motion to the nominal infeed motion. The amplitude of the sine wave is 0.5 times the nominal infeed, although this may vary somewhat due to the properties of the specific material being machined. The frequency of the sine wave is a non-zero integral multiple of the rotational frequency of the lens plus 0.5. Thus the minimum sine wave frequency will be 1.5 times the rotational frequency of the lens and this factor may increase by increments of 1. In equation form, $W_{SW}=(n+0.5) \times W_{RL}$ where $W_{SW}$ is the frequency of the sine wave, $W_{RL}$ is the rotational frequency of the lens and n is an integer equal to or greater than 1.

Application of this principle creates relative minima and maxima during one lens rotation that correspond to the relative maxima and minima on the next lens rotation, respectively. This causes the width of the strand of swarf to cycle in a range between approximately twice the nominal infeed and zero. Reducing the width of the strand to zero results in segmenting or breaking the strand of swarf. Because it may not be necessary to fully reduce the width of the strand to zero to break it, the amplitude of the sine wave may be relaxed somewhat depending on the material in question. Alternatively, the amplitude may be increased to introduce or increase deformation effects on the swarf which are beneficial to swarf containment.

The frequency relationship stated above insures that the relative minima of one revolution will occur at precisely the same angle as the relative maxima on the next revolution. Likewise, it insures that the relative maxima of one revolution will occur at precisely the same angle as the relative minima of the next revolution.

By applying the dynamic infeed control to the lathe, a smoother finished surface is obtained, the swarf is broken up at the lens or work piece, only segmented swarf is introduced into the suction system, no auxiliary chipping or melting equipment is required and down time and operator involvement is minimized.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
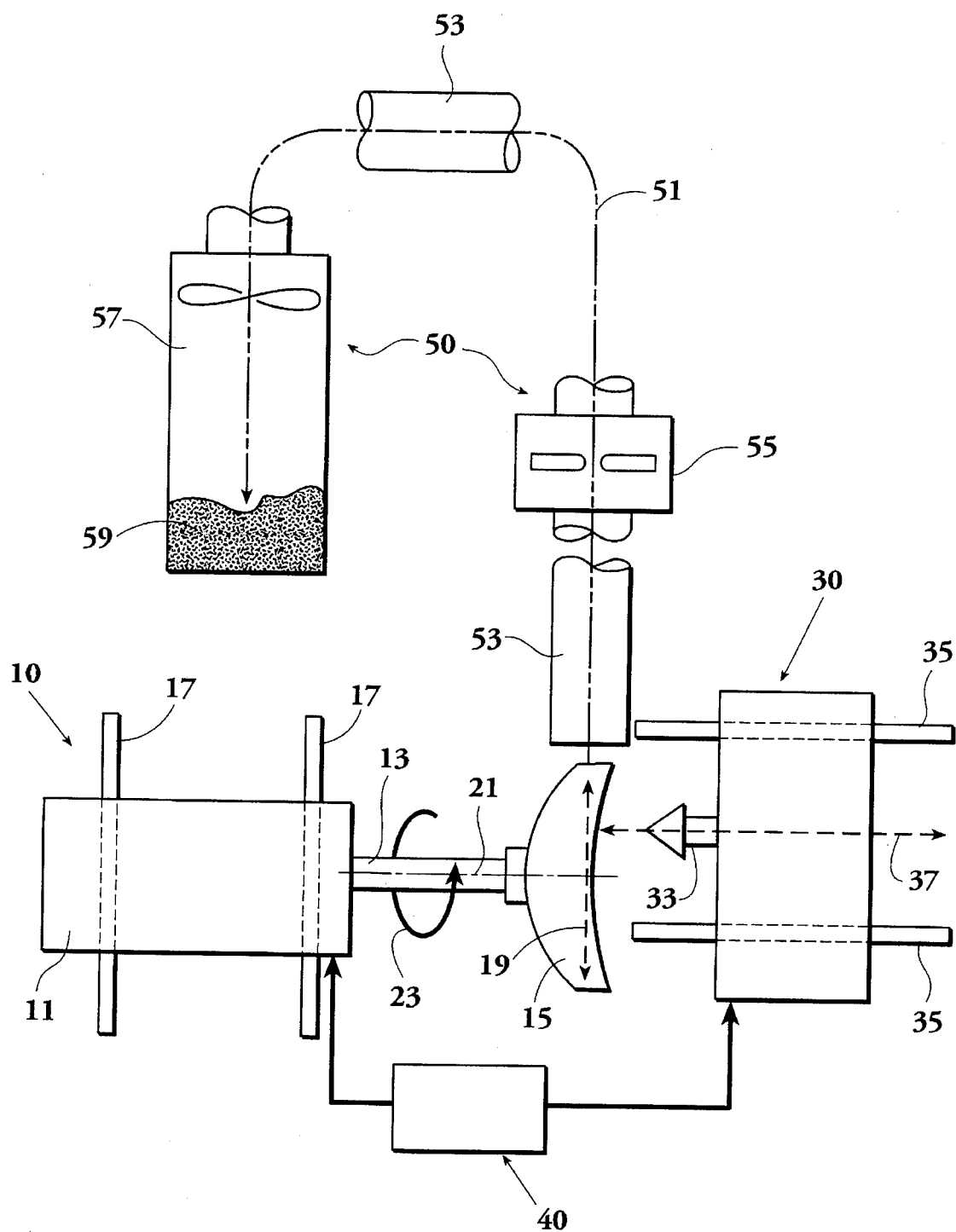
FIG. 1 is a block diagram illustrating a lens generator having a static infeed control.

To understand the principles of the present invention, it is helpful to summarize the principles of the prior art. As shown in FIG. 1, one presently known lens generator would include a lens or workpiece system 10 and a blade or tool system 30 under the control of a computer 40. An auxiliary system 50 removes the swarf from the device. Typically, the lens system 10 includes a carriage and drive motor 11 having its shaft 13 connected to a workpiece such as a lens 15. The lens carriage 11 is mounted on tracks 17 for reciprocal motion along a Y axis 19. The shaft 13 rotates about an X axis 21 perpendicular to the Y axis 19, the angular rotation of the shaft 13 in relation to a zero reference being identified as an angle θ 23. The blade or tool system 30 includes a carriage 31 on which a tool such as a blade 33, diamond cutter or other known cutting device is mounted. The blade or tool carriage 31 is mounted on tracks 35 which permit reciprocal motion of the blade carriage 31 along an X axis 37. Under the control of the computer 40, the positions of the carriages 11 and 31 and the angular position θ of the shaft 13 are coordinated to lens data defining the desired curvature of the lens 15 so that, as the lens 15 moves along the Y axis 19 from the outer edge of the lens 15 to the center of the lens 15, the X axis penetration of the blade 33 is varied to properly contour the lens 15. Typically, the computer system 40 will include linear encoders having perhaps a 1 micron resolution for determining the position of the carriages 11 and 31 along their Y 19 and X 37 axes, respectively, and a rotary encoder having perhaps a 0.04 degree angular resolution about the shaft X axis 21.

Figure 2:
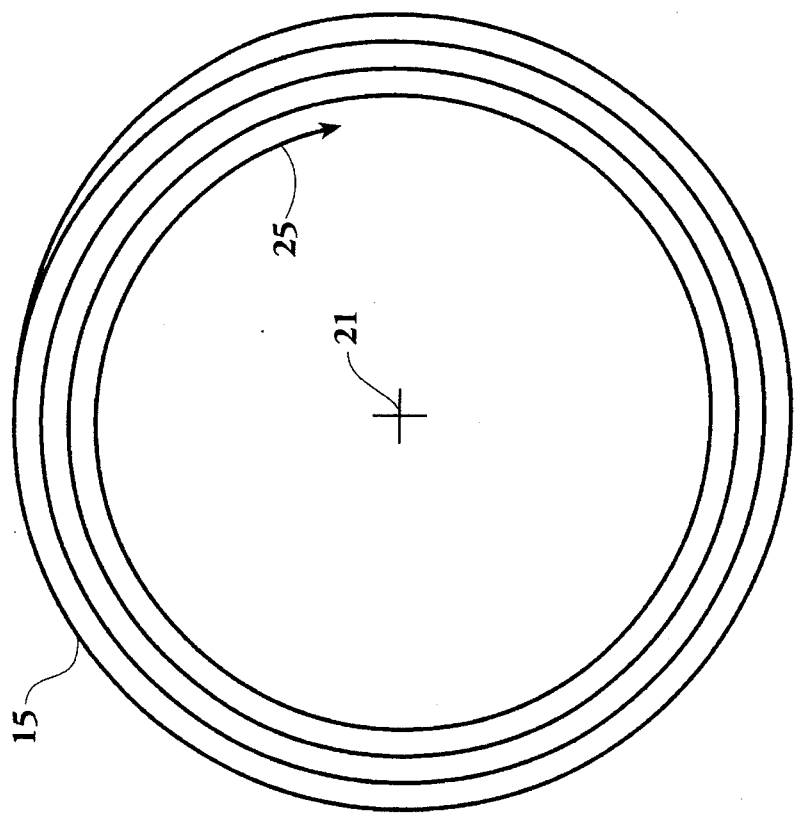
FIG. 2 is a front elevation view of a lens illustrating the spiral lathing path resulting from use of a lens generator having a static infeed control of the prior art.

In the operation of the prior art lens generator, as can best be seen in FIG. 2, as the lens 15 rotates about the shaft X axis 21 and the lens 15 gradually traverses along the Y axis 19, the blade 33 removes material from the lens 15 along a static spiral path 25 from the outer edge of the lens 15 to the center of the lens 15 at the shaft X axis 21. The result is that the material removed in the lathing process consists of a continuous strand of the curled and spiraled material removed from the edge to the center of the lens 15. To remove this strand of material or swarf from the lens maker, the auxiliary system 50 draws the swarf along a collection path 51 extending from the leading end of a vacuum hose 53 proximate the lathing point where the blade 33 meets the lens 15 through a chipping device 55 by a vacuum 57 so as to collect the chipped swarf 59 in the container of the vacuum 57. If no chipping device 55 or other auxiliary means for segmenting or consolidating the swarf 59 is used, then the swarf readily entangles in the auxiliary system 50 or in the components of the lens generator. Even when such auxiliary devices are used, entanglement still may occur before the swarf reaches those devices. Wherever entanglement occurs, the swarf 59 quickly backs up into the lathing mechanism with the results hereinbefore stated.

Figure 3:
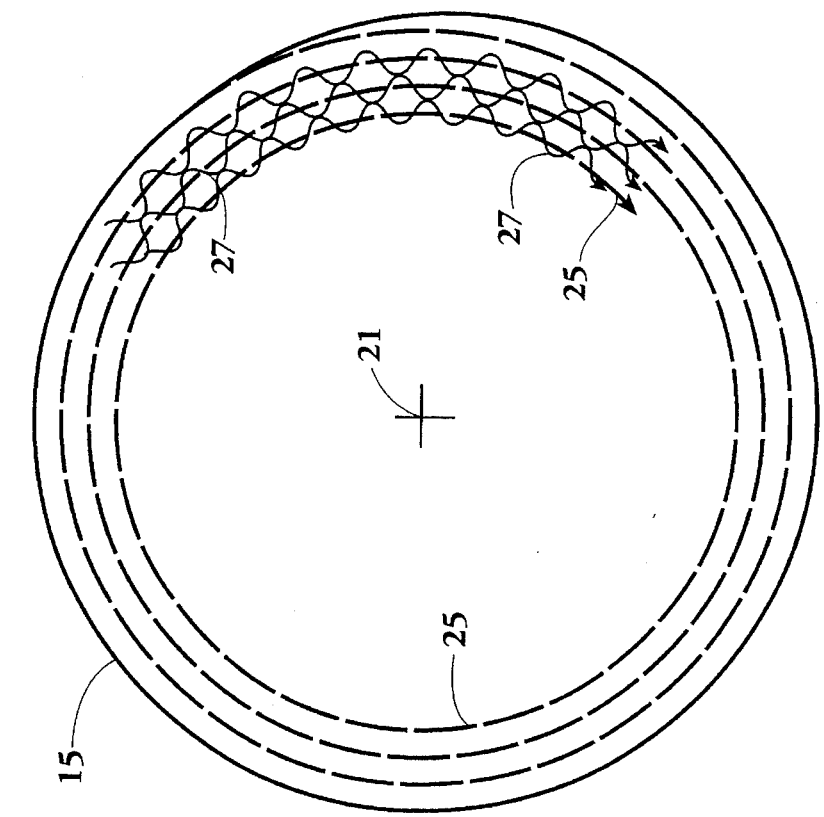
FIG. 3 is an enlarged front elevation view of a lens illustrating a preferred sinusoidal spiral lathing path resulting from use of a lens generator having the dynamic infeed control of the present invention.

Turning to FIG. 3, the solution to the problem is to superimpose on the static spiral path 25 a dynamically reciprocating path 27. That is, while the lens 15 shifts along the Y axis 19 at a substantially constant rate so that the blade 33 passes from the outer edge of the lens 15 to the center of the lens 15, the position of the lens 15 is also reciprocated at a selected frequency forwardly and rearwardly of the static spiral path 25.

Figure 4:
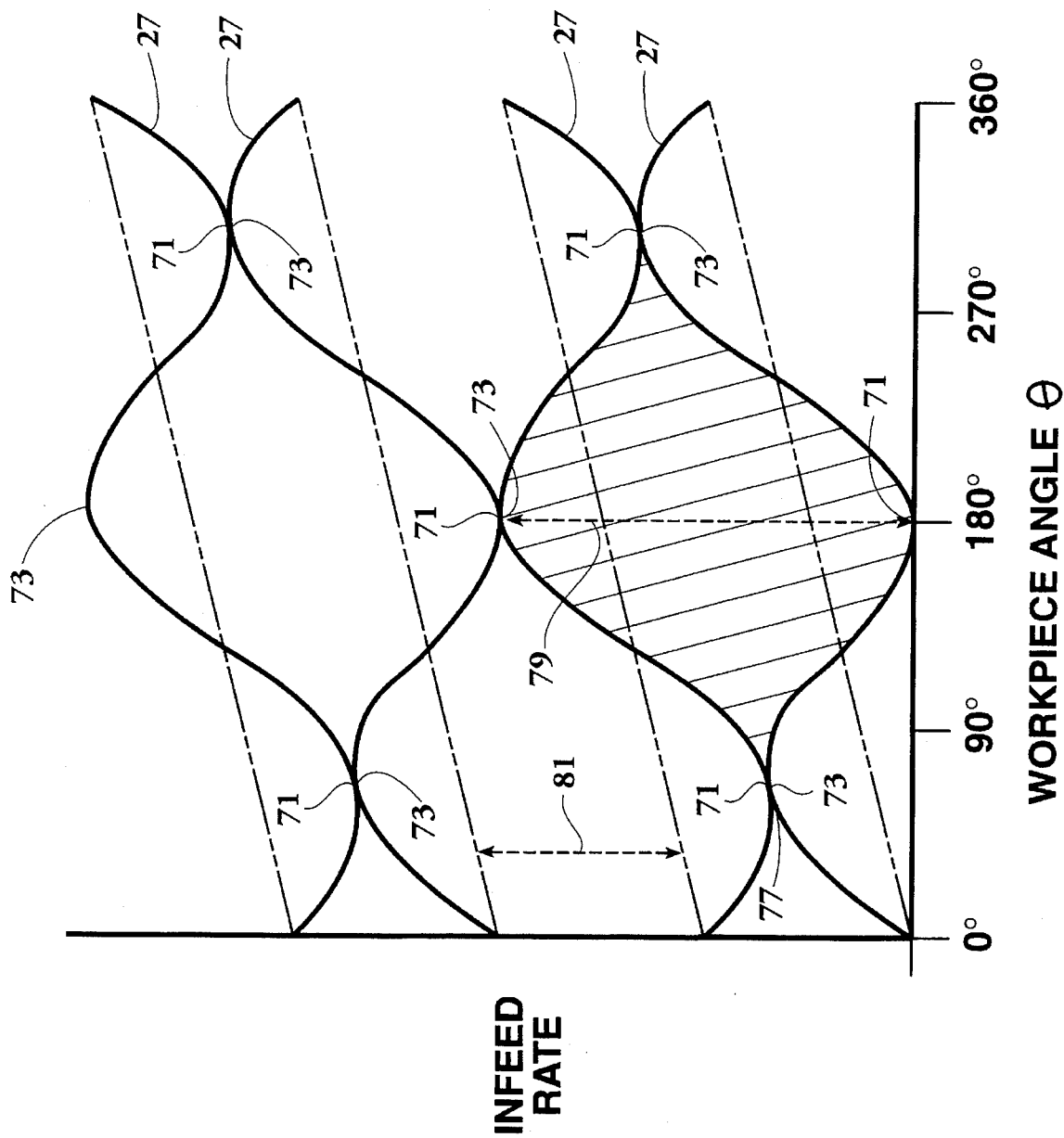
FIG. 4 is a graphic illustration of a sinusoidal spiral lathing path in which the frequency of the sinusoidal component 1.5 times the rotational frequency of the lens.

As shown in FIG. 4, the static spiral path 25 or infeed path has an oscillatory component added to the nominal infeed. Preferably, a sine wave motion is added to the nominal infeed motion. The amplitude of the sine wave is 0.5 times the nominal infeed, although this may vary somewhat due to the properties of the specific material being machined. The frequency of the sine wave is a non-zero integral multiple of the rotational frequency of the lens plus 0.5. Thus the minimum sine wave frequency will be 1.5 times the rotational frequency of the lens and this factor may increase by increments of 1. In equation form, $W_{SW}=(n+0.5)\times W_{RL}$ where $W_{SW}$ is the frequency of the sine wave, $W_{RL}$ is the rotational frequency of the lens and n is an integer equal to or greater than 1. The oscillatory component is given by $C_{SW}=\frac{1}{2}I\times \text{Sin}\ [\theta \times (N+0.5)]$ where $C_{SW}$ is the sine wave component, I is the nominal-infeed, θ is the rotational angle and N is any integer greater than or equal to 1. In the illustration shown, N is equal to 1. It can be seen that on each successive rotation, the relative minima 71 occur at the same angle as the relative maxima 73 of the previous pass. This relationship causes the swarf to be segmented, the area 75 corresponding to one such segment. To produce shorter swarf segments, a larger value of N is used. As shown in FIG. 4, the swarf width at the concurrence 77 of maxima and minima is substantially zero while the swarf width 79 at the divergence of maxima and minima is approximately twice the nominal infeed width 81. The frequency relationship stated above insures that the relative minima of one revolution will occur at precisely the same angle as the relative maxima on the next revolution. Likewise, it insures that the relative maxima of one revolution will occur at precisely the same angle as the relative minima of the next revolution. To accomplish this segmenting of swarf, as can be seen in FIG. 4, the rotational position of the lens 15 or workpiece angle θ 23 must be coordinated with the static movement and dynamic movement of the lens 15 along the Y axis 19 and the positioning of the blade 33 along the X axis 37.

The amplitude of the sine wave may be relaxed somewhat depending on the material being lathed. On the other hand, the amplitude may be increased to introduce or increase deformation effects on the swarf which are beneficial to swarf containment or to compensate for material flexure during the lathing operation.

Other oscillatory motions besides a sine save may be used as long as the tool 33 leaves the workpiece 15 at sufficient intervals during the process. The use of a sine wave superimposed on the spiral infeed is beneficial for a servo system since there are no higher order harmonics to which the servo system must respond. However, other types of dynamic motions may be preferred in some specific instances. For instance, when machining a rotationally symmetric surface, it may be desirable to run the spindle at a very high rpm. Using a sine wave at the minimum of 1.5 times the rotational frequency might result in a dynamic infeed component of too high a frequency for the servo system. Furthermore, the vibration produced might be undesirable. To counter this effect, the nominal infeed can be reduced to zero and all of the infeed produced by dynamic infeed components. Typically in this case the infeed will be a constant velocity move or a parabolic move in which the tool feeds in and then stops. Then the workpiece is allowed to make a complete "cleanup" rotation. This causes the swarf to reach zero width by the time the "cleanup" rotation is complete, effectively breaking the swarf strand. The disadvantage of this method is that the swarf segments are longer than those produced with the sine wave method.

Figure 5:
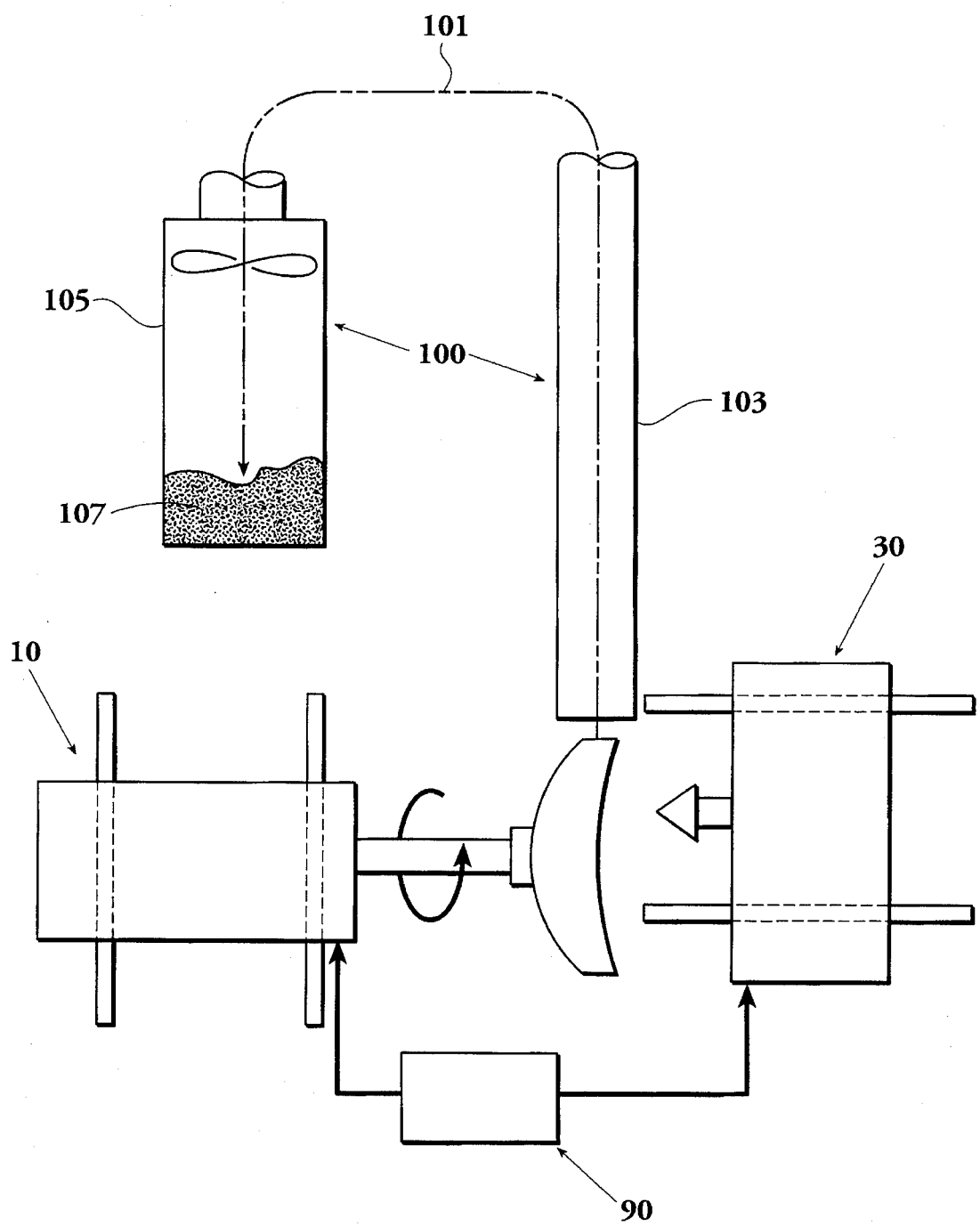
FIG. 5 is a block diagram illustrating a lens generator having the dynamic infeed control of the present invention.

Turning now to FIG. 5, a lens generator incorporating the principles of the present invention is illustrated. The workpiece system 10 and tool system 30 are substantially the same as illustrated in FIG. 1. In the computer system 90, the zero reference encoder dividing the lens revolution into, for example, 4,000 counts, provides positional coordination of the angular position θ of the lens 15 with the X 37 and Y 19 axes encoders so that, under the control of the computer 90, the maxima 73 and minima 71 substantially coincide for sequential rotations of the lens 15. Thus, while the frequency of oscillation remains constant, the wave length of the oscillation is gradually reduced to approximately zero as the blade 33 approaches the shaft X axis 21. As shown in FIG. 5, given this dynamic infeed control lens generator, the auxiliary system 100 does not require the chipping device 55 shown in FIG. 1 or any other segmenting equipment so that the collection path 101 includes only a vacuum hose 103 extending to a vacuum 105 for collecting the swarf 107.

It will be obvious to those skilled in the art that, should it be desired to machine the edge of the lenses rather than the face of the lens, the oscillatory action could be applied along the X axis 37 rather than the Y axis 19 so as to segment the swarf derived from the edge of the lens 15.

Thus, it is apparent that there has been provided, in accordance with the invention, a dynamic infeed control for segmenting swarf in a lathe application that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A machine for lathing a workpiece comprising:

a first carriage having means thereon for rotational motion of said workpiece about an axis;

means for guiding said first carriage for reciprocal motion of said workpiece in a direction transverse to said axis;

a second carriage having means thereon for lathing said workpiece;

means for guiding said second carriage for reciprocal motion of said lathing means in a direction parallel to said axis; and computer means for coordinating said workpiece rotational motion, said workpiece reciprocal motion and said lathing mens reciprocal motion to infeed said workpiece along said transverse direction to said lathing means at a nominal rate to lathe said workpiece to a predetermined shape and to reciprocate said workpiece along said transverse direction at an oscillatory rate, said computer means causing said lathing means to describe a path about said axis from an outer edge of said workpiece to a center of said workpiece having a spiral component about said axis resulting from said nominal infeed and an oscillatory component superimposed on said spiral component resulting from said oscillatory reciprocation so as to segment swarf removed from said workpiece by said lathing means.

2. A machine according to claim 1, said oscillatory reciprocation being a sine wave motion relative to said transverse direction.

3. A machine according to claim 2, said sine wave motion having an amplitude substantially equal to one half of a distance travelled by said workpiece in said transverse direction during one rotation at said nominal infeed rate.

4. A machine according to claim 2, said sine wave motion being equal to 0.5 ×I×Sin where I is said nominal infeed rate, θ is an angular position of said workpiece in relation to a zero reference and N is any integer greater than zero.

5. A machine according to claim 2, said sine wave motion having a frequency equal to (0.5+N)×W where N is any integer greater than zero and W is the rotational frequency of said workpiece.

6. A machine according to claim 1 said oscillatory component of each sequential 360 degree segment of said spiral path having maxima substantially coincident with minima of an immediately preceding 360 degree segment of said spiral.

7. A machine according to claim 6, said lathing means and said workpiece being spaced apart when said lathing means is aligned with said maxima.

\* \* \* \* \*